Oct. 16, 1962 R. H. EARY 3,058,220
GLASS SCORING MACHINE
Filed March 9, 1959 3 Sheets-Sheet 1
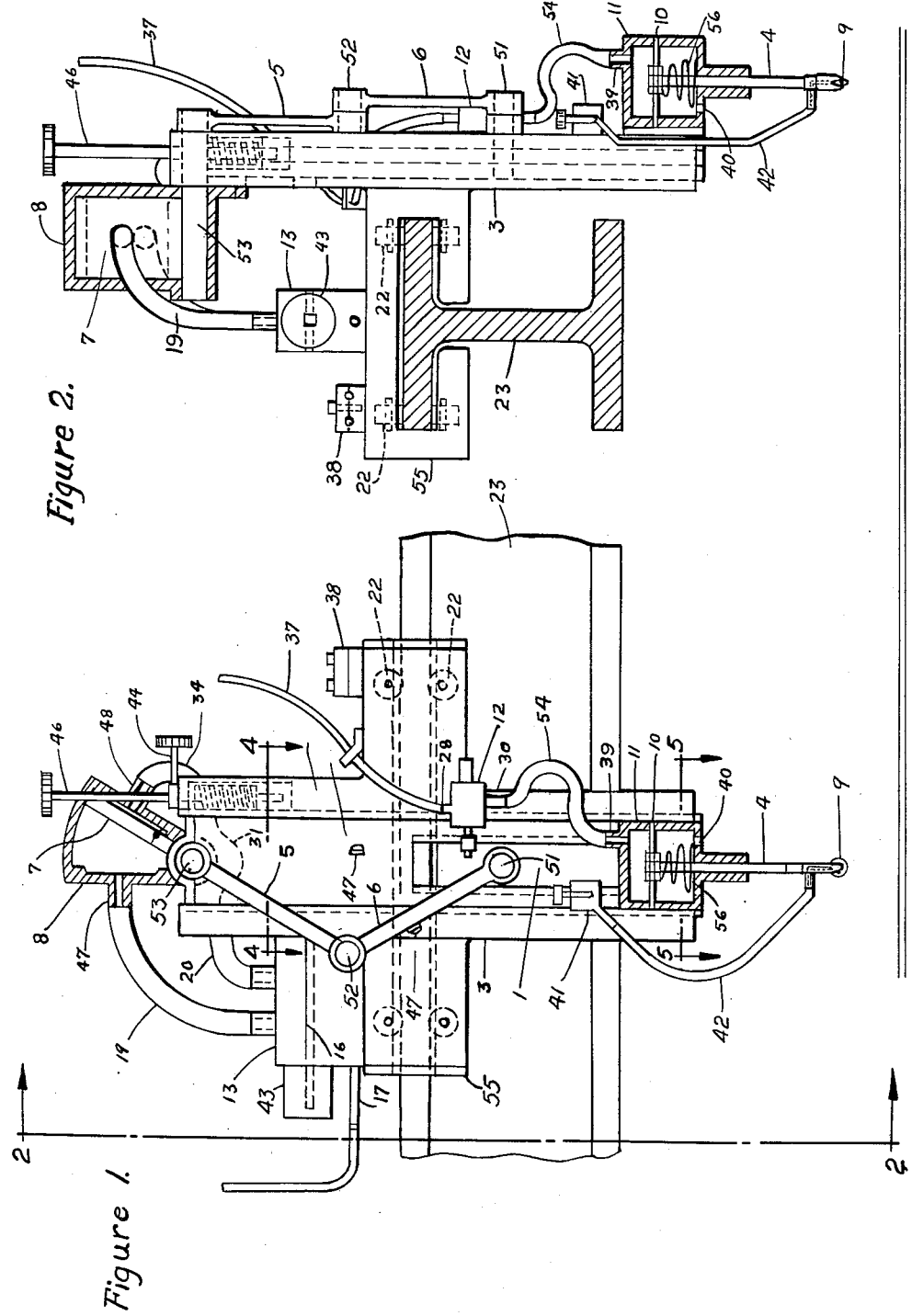

INVENTOR
Robert H. Eary
2/26/59

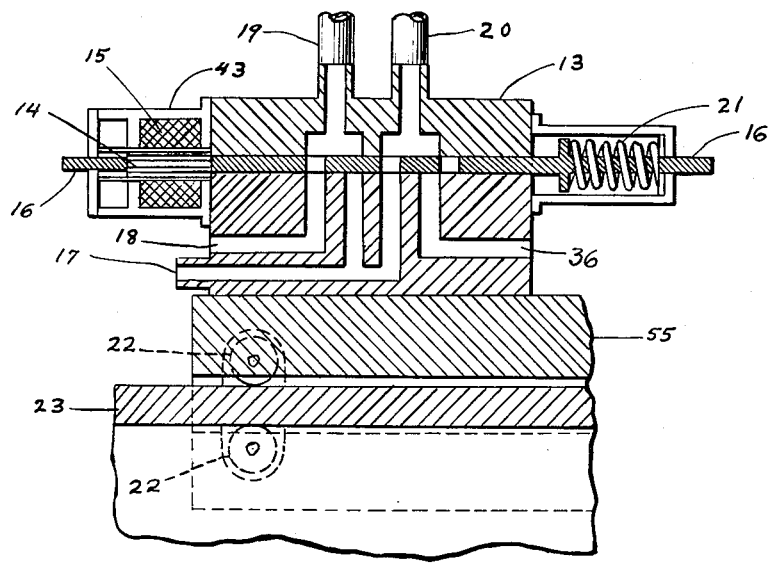
Figure 6.
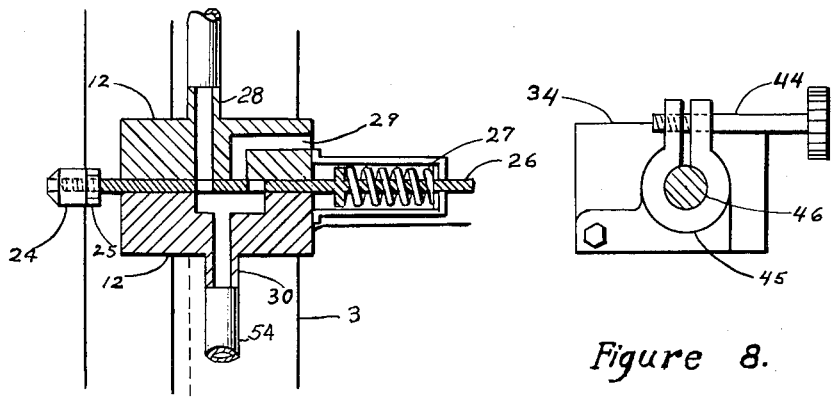
Figure 7.
Figure 8.

United States Patent Office 3,058,220
Patented Oct. 16, 1962

3,058,220
GLASS SCORING MACHINE
Robert Henry Eary, Charleston, W. Va.
(106 Riverthorn Road, Baltimore 20, Md.)
Filed Mar. 9, 1959, Ser. No. 798,188
10 Claims. (Cl. 33—32)

This invention relates to scoring tools and more particularly to scoring tools for sheet glass where it is desired to avoid cracking of the glass by the tool.

The invention has as one object the provision of improved mechanism for operating a scoring tool.

Another object of the invention is to provide a way of lowering a scoring tool against a sheet of glass in a manner which will reduce the impact against the glass.

Still another object is to provide a scoring tool for scoring a sheet of glass that is less likely to break the glass than in the case of prior glass scoring machines.

In carrying out the aforesaid objects I provide a mechanism that lowers the scoring tool in two steps. The first step lowers the tool abruptly to a position closely adjacent to the glass, preferably by means of a pneumatic vane and toggle arms, and this first step actuates a mechanism that starts the lowering device for the second step into operation. The device for the second lowering comprises a cylinder with a diaphragm and near the end of the first lowering step compressed air is fed into the cylinder and impressed on the diaphragm to cause the second step of the lowering operation to take place.

In the drawings:

FIGURE 1 is a cross-section of the machine.

FIGURE 2 is a cross-section of the carriage and its support, taken along line 2—2 of FIGURE 1.

FIGURE 6 is a cross-section view showing the compressed air inlet and valves.

FIGURE 7 is a cross-section showing details of valve 12 of FIGURE 1.

FIGURE 8 illustrates the details of the adjusting mechanism 44—46 of FIGURE 1.

Figure 3:
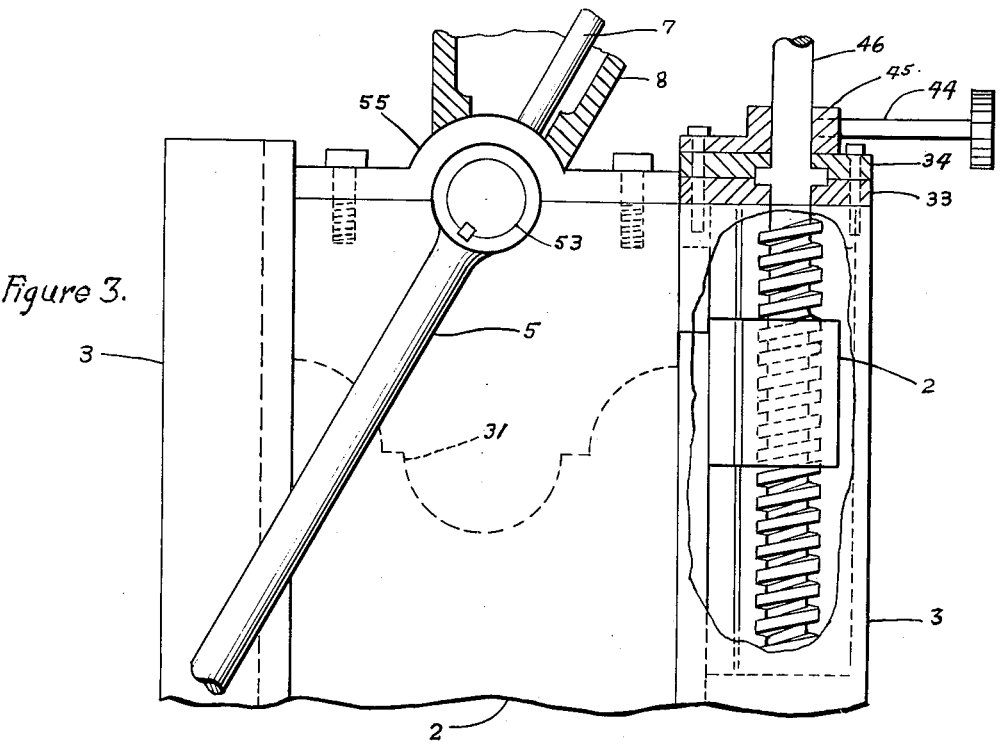
FIGURE 3 illustrates certain details of the vane for driving the toggle.

Briefly speaking the invention works as follows: Compressed air is fed in at 17 and solenoid valve 16 routes the air to conduits 19 and 20 selectively. The conduits 19 and 20 feed opposite sides respectively of the vane 7 which is pivoted at its lower end and connected to link 5 of the toggle. The lower end of link 5 is pivotally connected to the upper end of link 6. When the links 5 and 6 are out of alignment as shown, the pneumatic cylinder is raised and the scoring tool is well spaced from the glass. However, when solenoid 43 is operated to apply pressure to the right-hand side of vane 7, the two toggle links 5 and 6 move into alignment and this moves cylinder 11 downward until the scoring tool is adjacent the glass. The lower link 6 then moves into engagement with the control rod of valve 12 and allows compressed air to flow through conduit 54 to the cylinder 11. This moves the diaphragm 10 downward and applies a scoring pressure to the tool 9. All of the foregoing parts are mounted on a carriage 55 which runs on a track 23. If after scoring pressure has been applied the carriage is moved along the track by any well-known means, the glass will be scored. By means of adjusting screw 46, the extent of downward movement of the cylinder 11 may be controlled.

This pneumatically operated glass scoring machine has been designed to cut or score glass as it is drawn from the lehr, or for use in any cutting machine that cuts window glass into rectangular pieces. It is essentially a telescoping mechanism that is composed of parts 1, 2, 3, and 4 and is actuated by toggle arms parts 5 and 6. The telescoping assembly is fastened to the carrige in a vertical position and the carriage moves to the left making a scoring motion in that direction only. On the return motion to the right, the cutter wheel is raised above the glass. Part 3 is fixed to part 55 in a non-adjustable position. Part 2 slides inside of part 3 in a vertical motion and is adjustable vertically by means of hand-screw part 46. Part 1 slides with a vertical motion inside of part 2, with a motion that is controlled by toggle arms 5 and 6. Part 4 slides in a vertical motion inside of part 11 and is controlled by the motion of part 10, a flexible diaphragm.

Part 13 is an electromagnetically controlled reversing valve that feeds compressed air into chamber part 8 in a reversible fashion first on the right side and then on the left side. Part 43 is the electromagnet that moves the slide in part 13, to reverse the compressed air. Part 12 is a slide valve that feeds compressed air into the upper part of chamber 11 and at the proper time evacuates the compressed air in this chamber. Part 56 is a spring that is used under part 10 diaphragm to give it stability in operation. Part 9 is the cutting wheel that makes the score on the glass. Parts 22 are the wheels that the carriage rides on in the scoring and return motions. Part 38 is a cable locking clamp used to secure the cable that propels the machine from the left to right and the reverse. Part 41 is an adjustable oiler that feeds a small amount of oil to the cutting wheel part 9 through hose part 42. Part 45 is a friction locking collar that locks part 46 in the selected position, so that it cannot get out of adjustment while the machine is in operation.

FIGURE 1.—The compressed air to be applied into part 8 is about 8 lbs. per sq. in. The compressed air is first admitted to the right side of part 8 which forces part 7 to the left in a counterclockwise motion around pivot bearing part 53 and driving arms 5 and 6 to the right where they stop in a vertical position. This motion lowers part 1 and its assembly parts 10, 11, 4, and 9 in a descending motion that stops with part 9 at the surface of the glass to be scored.

Also as arm part 6 moves into the vertical position it presses the slide in valve part 12 to the right which admits compressed air of about 4 lbs. per sq. in. into hose 54 and the top of chamber part 11. This compressed air moves parts 10, 4, and 9 down so that part 9 maintains a smooth and uniform pressure on the glass to be scored. At this point a cable and drum system of propulsion is actuated which propels the machine to the left to make a score across the glass. When the machine gets to the other side of the glass, the reversing valve part 13 is reversed by means of the electromagnet part 43. This admits compressed air into the left side of chamber part 8 which forces part 7 to the right in a clockwise motion around pivot shaft 53. This motion moves arms 5 and 6 to the left which lifts part 1 and its assembly well above the glass. At this point the propelling cable and drums are reversed and the machine is propelled to the right on the track part 23. As part 6 is moved to the left, a return spring in the valve 12 returns the slide in the valve which closes off the compressed air to part 11 and at the same time releases the pressure that is in this chamber.

The side of chamber part 8 that is before the advancing motion of part 7 is at all times being evacuated through one of the exhaust vents of part 13. Parts 47 are stopping posts to stop the toggle arms in the proper positions.

FIGURE 2.—This figure is taken at 90° angle from the figure in FIGURE 1, and shows the location of part 8 in relation to part 46 and how parts 5 and 6 are assembled. The adjustable oiler part 41 is secured to part 2. Part 56 is a coil spring that is used under diaphragm part 10 to prevent independent vibration and reciprocation of part 4 while the machine is in operation. It shows how the carriage part 55 fits around the top of the I-beam track part 23.

FIGURE 3.—This shows the top of the telescoping mechanism. Part 46 is the adjustable screw shaft that moves part 2 vertically to adjust it vertically to the proper height in relation to the glass. Part 46 is turned to the right or the left to raise or lower the part 2. This is accomplished by a collar that is enclosed in part 3 and is made as an integral part of part 2 and extends from the main body of part 2 through the slide groove that holds part 2 into part 3. Parts 33 and 34 are bearing plates that carry the vertical thrust and load of part 46 and all the operating parts including 2, 1, 5, 6, 10, 4, 9, and 41. Part 46 is locked in the selected position by a friction locking collar part 45, which is tightened with a threaded screw and knob part 44. Line No. 31 indicates the recessed top of the back of part 3 that is necessary to make room for a possible descending adjustment of parts 2 and 8.

Figure 4:
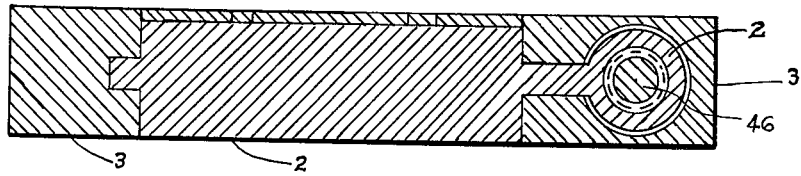
FIGURE 4 is a cross-section of the body taken along line 4—4 of FIGURE 1.

FIGURE 4.—This figure shows how part 2 is keyed into part 3 and how the screw collar is enclosed in part 3 at the right of the keyway.

Figure 5:
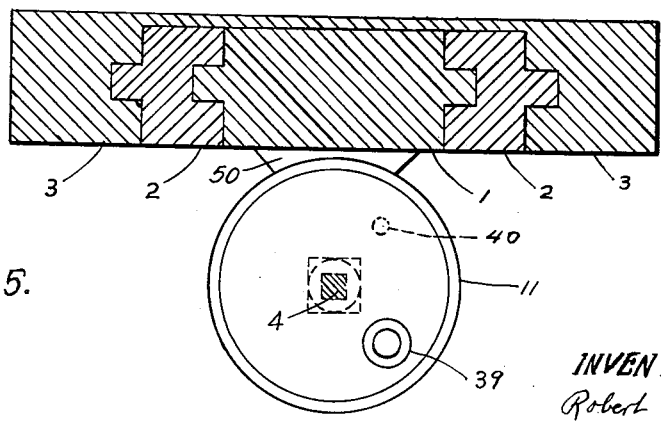
FIGURE 5 is a cross-section of the body taken along line 5—5 of FIGURE 1.

FIGURE 5.—This figure shows a cross-section of the telescoping body along line 5—5 of FIGURE 1. It is shown how part 1 is keyed into part 2 with keyways on both sides and how part 2 is keyed into part 3 with keyways on both sides. It is also shown that there is a shell back that connects the two sides of part 3 in a fixed position that will assure accurate alignment between parts 2 and 3 at all times. Part 4 is made square so that the cutter wheel will not twist in its cutting plane. Number 40 is a hole that permits the atmospheric pressure to prevail in the lower part of part 11 at all times.

FIGURE 6.—This figure shows the details for the reversing valve for the compressed air. The compressed air comes in at No. 17 and leaves through the hosepart 20 to the right side of part 8. The air leaves valve to the left side of part 8 through hose part 19. The electromagnet 15 is energised in this figure and arms 5 and 6 are held in the vertical position ready for the scoring motion. When the electromagnet is not energised the return spring part 21 returns the slide to the left, which reverses the air into the left side of part 8 thereby lifting part 1 and its cutting assembly and the cutting wheel well above the glass. Part 14 is the armature of the electromagnet, and it reciprocates horizontally. Parts 18 and 36 are exhaust vents and are used alternately.

FIGURE 7.—This figure shows the details of part 12. The low pressure compressed air (4 lb. per sq. in.) enters at opening 28, goes down through the slide and exits the valve and goes through hose 54 to chamber part 11. This valve is shown in the depressed position. When arm 5 moves away from the slide tappet part 24, to the left, a return spring part 27 moves the slide 26 to the left which stops the compressed air to part 11, and at the same time releases the compressed air that is then in part 11 through exhaust port 29. Part 24 is a horizontally adjustable tappet on the slide shaft, and 25 is a locknut to secure firmly part 24.

FIGURE 8.—This figure shows the friction locking collar part 45 that locks the adjustment screw part 46 in the selected position. Part 34 is the vertical thrust bearing plate as well as part 33. Part 44 is a tightening screw that tightens the friction collar part 46.

I claim:
1. In a glass scoring machine, a carriage movable with respect to a sheet of glass, said carriage supporting all of the following parts: a solenoid valve having an input connected to a source of air under pressure and having two outputs which may be selectively connected by the valve to said source of air under pressure, a pivoted vane, a housing for the vane, two conduits communicating with said housing for respectively applying pressures on said vane in opposite directions whereby the vane may be moved in opposite directions under control of said solenoid valve, a toggle having two links, the first end of the first link being connected to said vane so the first link rotates about the same pivot as does the vane, a rotatable connection between the second end of the first link and the first end of the second link, movable means pivoted to the second end of the second link and reciprocated thereby, said toggle having its two links in alignment with each other when the vane is in one extreme position thereby positioning the movable means in its closest proximity with the sheet of glass and having its two links at an angle to each other when the vane is in the other extreme position thereby positioning the movable means in its farthest position from the sheet of glass, a cylinder carried by said movable means, a diaphragm on that side of the cylinder closest to the sheet of glass, a scoring tool carried by the diaphragm and movable thereby and which is moved toward the sheet of glass when the vane moves the two toggle links toward alignment, and conduit means including a valve which is opened by said toggle when its links move into alignment for applying compressed air to said cylinder to thereby cause the scoring tool to apply scoring pressure to the sheet of glass, whereby the glass may be scored upon movement of said carriage.

2. In a glass scoring machine, a carriage movable with reference to the glass to be scored and carrying all of the following parts, a scoring tool, a diaphragm supporting the scoring tool, a cylinder for actuating said diaphragm and for carrying the same, a conduit leading to said cylinder for supplying compressed air thereto to move said diaphragm and thereby apply a force to the scoring tool which force is directed toward the glass, a spring biasing the scoring tool away from the glass, mounting means for said cylinder to enable it to have reciprocal motion toward and away from the glass, toggle means having two links pivoted together at one end of each link, pivot means for the other end of the first link to permit rotation thereof about a fixed axis, a vane attached to said other end for rotating said first link about said pivot means, pneumatic means for selectively applying air pressure to either side of said vane to thus determine the direction of rotation thereof, said pneumatic means including solenoid valve means for feeding air under pressure selectively to either side of said vane, means connecting the other end of said second link to said cylinder whereby when said vane is rotated in a direction which moves the two links of the toggle in alignment the cylinder is moved toward the glass, and a valve in said conduit which is engaged by one of said links when they move into alignment with each other to thereby allow compressed air to flow to said cylinder and cause the scoring tool to apply a scoring pressure to the glass to be scored.

3. In a glass scoring machine, a carriage movable with respect to a sheet of glass, said carriage supporting all of the following parts: an input conduit having compressed air, a solenoid valve having two output conduits and including means operable to connect the input conduit to either output conduit, a pivoted vane, a housing for the vane, said two conduits respectively feeding said housing on opposite sides of the vane whereby the vane may be moved in opposite directions by operation of the solenoid valve, a toggle having two links the first end of the first link being connected to said vane and rotatable therewith, means connecting the second end of the first link to the first end of the second link for pivotal rotation, mounting means pivoted to, and moved toward and away from the sheet of glass by the second end of the second link, said mounting means carrying a pneumatic cylinder, a scoring tool, a diaphragm in said cylinder for supporting the scoring tool and applying scoring pressure to the sheet when the cylinder is supplied with air under pressure, and means including a valve actuated when said links are moved into alignment with each other for supplying compressed air to said cylinder to thereby apply scoring pressure to the scoring tool.

4. In a machine for scoring glass, a carriage movable laterally with respect to the sheet of glass to be scored, a scoring tool operatively connected to said carriage, means for moving the scoring tool abruptly toward the glass but only to a limiting position wherein said tool is ineffective to apply a scoring pressure to the glass thereby to prevent breakage of the glass, means on said carriage being responsive to the reaching by said first-named means of its said limiting position for moving said tool with a scoring pressure against the glass, said carriage being thereafter movable to move the scoring tool relative to the glass while the two are in scoring position.

5. In a machine for scoring glass, a scoring tool, a movable carriage for carrying the scoring tool and for moving the scoring tool across the glass to be scored after the scoring tool has been moved to scoring position, means mounted on said carriage for abruptly moving the scoring tool toward the glass but only to a predetermined position in which no scoring pressure is applied to the glass thereby to prevent breakage of the glass, and pneumatic means on the carriage and responsive to the reaching by said scoring tool of its said predetermined position for moving the tool with a uniform scoring pressure against the glass while the carriage is being moved.

6. In a glass scoring machine, a scoring tool, a movable carriage carrying said tool for laterally moving the scoring tool with respect to a sheet of glass to be scored, pneumatic means mounted on said carriage for moving the scoring tool toward the glass but only to a predetermined position in which said tool is close to but not in actual contact with the glass thereby to avoid breakage of the glass, and second pneumatic means on the carriage and responsive to said first-named means reaching said predetermined position for moving the tool with a scoring pressure against the glass to apply a smooth and uniform scoring action when the carriage is moved, said first pneumatic means effecting more rapid motion of said tool than the second pneumatic means thereby quickly to bring the scoring tool to said predetermined position.

7. In a glass scoring machine, a carriage movable with respect to a sheet of glass, said carriage supporting all of the following parts: a motor; a toggle having two links the first end of the first link being operatively connected to said motor and moved thereby; means connecting the second end of the first link to the first end of the second link for pivotal rotation; mounting means pivoted to and moved toward and away from the sheet of glass by the second end of the second link; said mounting means carrying a pneumatic cylinder, a scoring tool, a diaphragm in said cylinder for supporting the scoring tool and applying scoring pressure to the sheet when the cylinder is supplied with air under pressure, and means including a valve actuated when said links are moved into alignment with each other for supplying compressed air to said cylinder thereby to apply scoring pressure to the scoring tool.

8. In a scoring machine, a carriage movable laterally with respect to the object to be scored, a scoring tool on said carriage, means mounted on said carriage for moving the tool rapidly toward and retracting it from the object to be scored, said means when moving said tool toward said object being effective to move said tool only to a limiting position wherein substantially no scoring pressure is applied to said object, and means on said carriage responsive to said tool reaching said limiting position to move said scoring tool with a scoring pressure against said object.

9. In a scoring machine, a carriage, a scoring tool operatively connected to said carriage, means for supporting the object to be scored, means on said carriage and under manual control for moving the scoring tool rapidly toward and retracting it from the object to be scored, said last-named means when moving said tool toward said object bringing said tool only to a limiting position where no scoring pressure is applied to said object, means on said carriage responsive to the said tool's reaching said limiting position for moving said tool against said object with a scoring pressure, and means for moving at least one of said carriage and said supporting means to thereby cause said object to be scored by said tool.

10. In a scoring machine, a carriage movable laterally with respect to the object to be scored, a tool carrier mounted on said carriage and carrying a scoring tool, means mounted on said carriage for moving the carrier and the tool toward and retracting it away from the object to be scored, said carrier being movable by said moving means to a limiting position, and means operated by the first means only after it has moved the carrier to its limiting position for shifting the tool relative to the carrier into operative position and for pressing the scoring tool against the object.

References Cited in the file of this patent

UNITED STATES PATENTS

| | | |
|---|---|---|
| 435,390 | Broadwell | Sept. 2, 1890 |
| 1,035,828 | Albree | Aug. 20, 1912 |
| 2,361,049 | Oakes | Oct. 24, 1944 |
| 2,556,757 | Guild | June 12, 1951 |